US 12,193,600 B2

United States Patent
Lampaert

(10) Patent No.: US 12,193,600 B2
(45) Date of Patent: Jan. 14, 2025

(54) INERTIAL COOKTOP AND MANUFACTURING METHOD

(71) Applicant: SISTERIA, Montauban (FR)

(72) Inventor: Rémy Lampaert, Brignemont (FR)

(73) Assignee: SISTERIA, Montauban (FR)

( * ) Notice: Subject to any disclaimer, the term of this patent is extended or adjusted under 35 U.S.C. 154(b) by 26 days.

(21) Appl. No.: 17/473,047

(22) Filed: Sep. 13, 2021

(65) Prior Publication Data

US 2022/0007883 A1 Jan. 13, 2022

Related U.S. Application Data

(63) Continuation-in-part of application No. 15/735,202, filed as application No. PCT/FR2016/051406 on Jun. 10, 2016, now abandoned.

(30) Foreign Application Priority Data

Jun. 12, 2015 (FR) ...................................... 15 55371

(51) Int. Cl.
*A47J 36/02* (2006.01)
*A47J 37/06* (2006.01)
*B22D 19/04* (2006.01)

(52) U.S. Cl.
CPC ........... *A47J 36/02* (2013.01); *A47J 37/0682* (2013.01); *B22D 19/04* (2013.01)

(58) Field of Classification Search
CPC ........ A47J 36/02; A47J 37/0682; B22D 19/04
USPC .......................................................... 99/422
See application file for complete search history.

(56) References Cited

U.S. PATENT DOCUMENTS

| 4,544,818 | A | * | 10/1985 | Minamida | ............... | A47J 36/02 |
| | | | | | | 99/422 |
| 4,635,701 | A | * | 1/1987 | Sare | ....................... | B22D 19/08 |
| | | | | | | 164/102 |
| 5,227,597 | A | * | 7/1993 | Dickens | .............. | A47J 37/0676 |
| | | | | | | 219/622 |

(Continued)

FOREIGN PATENT DOCUMENTS

| DE | 93 08 029 U1 | 9/1993 |
| EP | 0 970 648 A1 | 1/2000 |

(Continued)

OTHER PUBLICATIONS

Wrobel, "Characterization of Bimetallic Castings with an Austenitic Working Surface Layer and an Unalloyed Cast Steel Base," J. Material Eng. Perforance, Mar. 25, 2014, pp. 1711-1717, vol. 23, No. 5.

*Primary Examiner* — Nathaniel E Wiehe
*Assistant Examiner* — Ket D Dang
(74) *Attorney, Agent, or Firm* — H&I PARTNERS; Chai Im; C. Andrew Im

(57) ABSTRACT

A food cooking appliance includes a panel having a thermal inertia, and a heater to heat the panel from the bottom face thereof. The panel has at least two plates that lie on top of each other. Plates are made of different materials and are in close contact with one another across part of the facing surfaces thereof. The upper plate being suitable to receive the food to be cooked, and is made of stainless steel or titanium. The lower plate is made of cast iron. A method for manufacturing a panel consisting of two metal plates that are made of different materials and are bonded together in a metal casting process.

7 Claims, 1 Drawing Sheet

(56) References Cited

U.S. PATENT DOCUMENTS

| | | | | |
|---|---|---|---|---|
| 5,564,590 | A | * 10/1996 | Kim | A47J 36/02 |
| | | | | 220/573.1 |
| 6,109,504 | A | 8/2000 | Groll | |
| 6,138,554 | A | * 10/2000 | McFadden | H05B 3/72 |
| | | | | 99/422 |
| 8,464,892 | B2 | * 6/2013 | Bourdin | H05B 6/12 |
| | | | | 220/573.3 |
| 2006/0107842 | A1 | * 5/2006 | Groll | B23K 26/28 |
| | | | | 99/422 |
| 2009/0206093 | A1 | 8/2009 | Knight | |
| 2010/0050884 | A1 | * 3/2010 | Leikam | A47J 37/0676 |
| | | | | 99/422 |

FOREIGN PATENT DOCUMENTS

| | | | | |
|---|---|---|---|---|
| EP | 1 946 685 A1 | | 7/2008 | |
| FR | 876 659 A | | 11/1942 | |
| JP | 2005321108 A | * | 11/2005 | A47J 36/02 |
| KR | 2014080822 A | * | 7/2014 | B22D 19/08 |
| KR | 20160032899 A | * | 3/2016 | |
| WO | WO-2007085132 A1 | * | 8/2007 | A47J 27/002 |

\* cited by examiner

INERTIAL COOKTOP AND MANUFACTURING METHOD

RELATED APPLICATIONS

This application is a continuation-in-part of application Ser. No. 15/735,202 filed Dec. 11, 2017, which is a § 371 application from PCT/FR2016/051406 filed Jun. 10, 2016, which claims priority from French Patent Application No. 15 55371 filed Jun. 12, 2015, each of which is incorporated herein by reference in its entirety.

TECHNICAL FIELD

The present invention falls within the field of food cooking devices.

It relates more particularly to a device of high-thermal inertia griddle type, in particular of the type known usually as a "plancha". The invention also relates to a method of manufacturing such a griddle.

BACKGROUND OF THE INVENTION

Cooking food on a top with a high thermal inertia has been known for many years. It makes it possible to cook food, for example meat, with a great consistency of applied heat, as well as a uniform temperature over the entire cooktop, and therefore, over the entire food being cooked. Such devices are, for example, known as plancha in the case of individual use, but they are also used in industrial kitchens or in restaurants.

Currently, there are already several types of thermal inertia cooktops.

A first type of cooktop is made of enameled cast iron. Gray cast iron (iron alloy+2 to 6.67% carbon) alone, indeed, has a non-smooth surface that sticks to food, preventing it from being easily detached from the surface of the griddle. The enameled cast iron facing addresses this problem and has excellent thermal homogeneity on the cooking surface and allows easy maintenance of the surface. The latter nevertheless remains fragile. Indeed, the facing may flake over time, making the product lose the ease of maintenance and the food-related function thereof. The cast iron can, moreover, break under the effect of a thermal shock. Regarding the cast iron itself, this tends to deform over time, thus forming a non-planar surface impeding cooking (with areas retaining fat, in particular).

A second type of cooktop is made of food-grade stainless steel. This facing has a very resistant cooking surface and offers very easy maintenance, but has, on the other hand, poor thermal homogeneity. Stainless steel is, indeed, a bad conductor of heat, and such a cooktop then requires a large number of burners to compensate for this phenomenon. The energy consumption is then clearly increased. Finally, the thermal inertia of food-grade stainless steel is low and the cooking plate becomes cold again quickly after stopping the heating thereof by the burners.

A third type of cooktop is made of food-grade steel (iron alloy and a small quantity of carbon). This material offers the advantage of good heat conduction and of being unbreakable and resistant to the risk of scratching. By contrast, the main defect thereof is that it rusts over time and therefore requires regular maintenance to counter this phenomenon. Similarly, the inertia and the heat conduction of this material remain clearly inferior than those of cast iron.

Other types of plate are also known, for example of hard chrome (expensive and toxic at high temperature), etc.

As is seen, each of these devices has various specific problems that hinder the widespread use of griddles.

OBJECT AND SUMMARY OF THE INVENTION

The aim of the present invention is to propose a new high-thermal inertia griddle device, to solve some of the problems mentioned above, and in particular to provide the cooking surface with a high level of resistance.

For this purpose, it relates, in a first aspect, to a food cooking device, including a high-thermal inertia griddle and means for heating said griddle by the bottom surface thereof, said griddle comprising at least two stacked plates of different materials, which plates are kept in close contact on part of the surfaces thereof which are placed opposite one another.

It is understood that, in this manner, depending on a wise choice of materials, the disclosed device makes it possible to provide a griddle that requires little maintenance.

Similarly, if materials are chosen such that the top plate, suitable for receiving the food to be cooked, is made of stainless steel or titanium, while the bottom plate is made of cast iron, the griddle retains, in this case, the thermal inertia and conduction qualities of the cast iron, while providing the surface resistance of food-grade stainless steel or titanium.

In one embodiment, the thickness of the top plate is clearly less than the thickness of the bottom plate, typically between two and ten times less.

More particularly, in this case, the thickness of the top plate is from one to five millimeters, while the thickness of the bottom plate is from 0.5 to two centimeters.

In one embodiment, the bottom plate is composed of several elements arranged side by side. Alternatively, the bottom plate is made in one piece.

In this case, the elements are, for example, configured as groups of lozenges, the faces of which are not parallel to the outer edges of the top plate.

In an advantageous embodiment, the two plates are kept in close contact against each other by hot-bonding, without using external material.

The invention relates, in a second aspect, to a griddle manufacturing method including two plates of different materials, which materials are closely pressed on the surface thereof without using external material.

The invention in particular relates to a method of manufacturing a griddle composed of two metal plates of different materials, which materials are bonded together in a foundry. This method is, as is understood, directly applicable to the case of manufacturing a thermal inertia griddle.

The method for hot-bonding a cast iron plate and a stainless steel or titanium plate comprises the following steps:

in a first step, the cast iron plate is made to the predetermined dimensions, in a second step, the cast iron plate is inserted in a cold state into a foundry mold, in a third step, molten stainless steel or molten titanium is added into this mold to make the stainless steel or titanium plate, respectively.

Alternatively, it includes the following steps:

in a first step, the stainless steel or titanium plate is made to the predetermined dimensions, in a second step, the stainless steel or titanium plate is inserted in a cold state into a foundry mold, in a third step, molten cast iron is added into this mold to make the cast iron plate.

BRIEF DESCRIPTION OF THE DRAWINGS

The features and advantages of the invention will be better understood thanks to the following description which discloses the features of the invention by way of a non-limiting example of use.

The description is based on the appended figures in which.

DETAILED DESCRIPTION OF AN EMBODIMENT OF THE INVENTION

The invention falls within the scope of a cooking device using a cooktop with thermal inertia. The description relates only to the cooktop itself. The burners and other elements of the heating device are assumed to be known per se. As such, they depart from the scope of the present invention, and therefore are not detailed further here.

Figure 1:
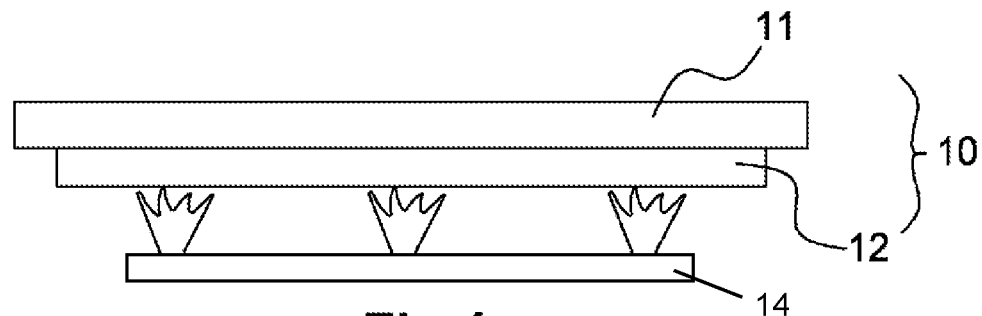
FIG. 1 is a side view of a griddle in an embodiment of the invention.

As is seen in FIG. 1, which illustrates a side view of such a cooking device comprising the cooktop 10 comprising two stacked plates 11, 12, and a single heater 14.

The top plate 11 is the actual cooking surface. It is intended to receive the food to be cooked, with which it therefore comes into contact. The top plate in this case is rectangular, but any other shape related to the conditions of use may be feasible. It is, in this case, made of food-grade stainless steel of a type known per se. Food-grade stainless steel is a stainless steel-type alloy, for example iron+chrome (at least 13%)+nickel+carbon, with proportions of these materials suitable for preventing any rusting phenomenon over time. The type of food-grade stainless steel envisaged in this case is that designated by the American reference 304L. Other alloys with equivalent characteristics (particularly resistance to temperature variations) are, however, possible. The top plate 11 can also be made of titanium. Titanium advantageously makes the top plate 11 resistant to corrosion, wear, fire, and particularly to temperature variations.

In the present exemplary embodiment which is in no way limiting, the thickness thereof is one millimeter.

The bottom plate 12 forms the heating body. In this case, it is made of cast iron. Alternatively, it may be made of steel, for example open-hearth steel, or any other material having good thermal conduction qualities.

In the present exemplary embodiment which is in no way limiting, the thickness thereof is five millimeters. This thickness is determined by the thermal inertia qualities desired for the cooktop.

Figure 2:
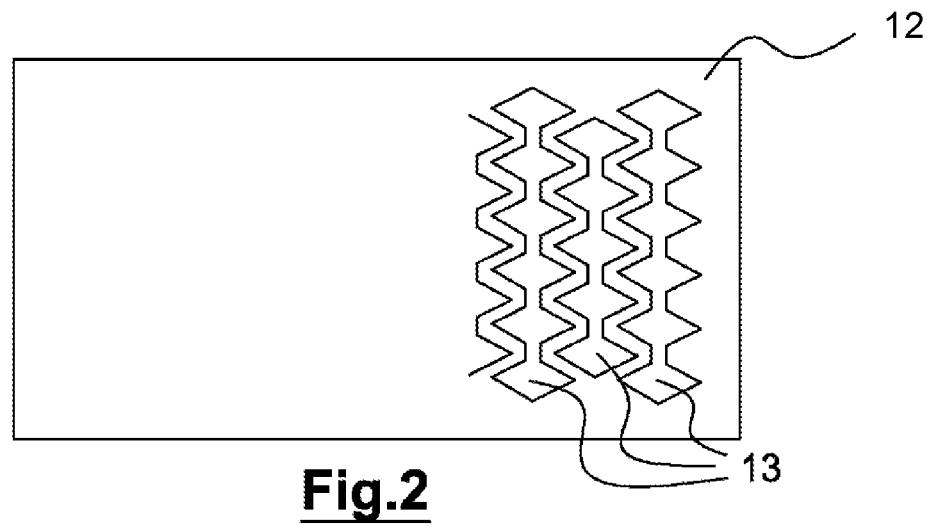
FIG. 2 is a bottom view of such a griddle, in a particular embodiment.

FIG. 2 shows a bottom view of the griddle. As seen in this figure, the bottom plate 12, made of cast iron, is in fact composed of several elements 13 arranged side by side, so as to prevent the differential expansion problem that may lead to a rupture of the cast iron plate. These elements are, in this case, configured as groups of lozenges, the faces of which are not parallel to the outer edges of the top plate 11. A space of one to a few millimeters is provided between the elements 13.

In the embodiment given in this case without limitation, the two plates 11, 12 are held in close contact against each other by hot-bonding, without using external material.

Figure 3:
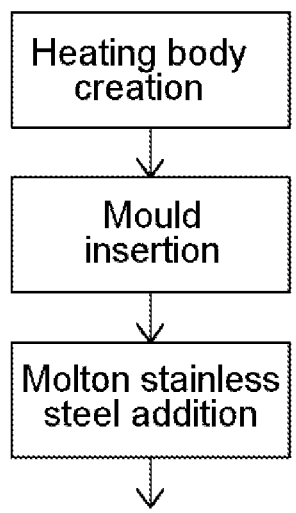
FIG. 3 is a block diagram of the steps of a method of manufacturing a griddle formed from two materials bonded along the opposing surface thereof.

The hot-bonding method comprises a series of steps detailed in FIG. 3.

In a first step, the stainless steel or titanium plate is made in a conventional manner. Then, this plate is subjected to abrasive scouring of the surface to be bonded.

Degreasing of the surface to be bonded is then carried out with a solvent, for example of methyl ethyl ketone type.

The stainless steel or titanium plate is then put into a mold.

Cast iron is then cast on this plate, followed by slow cooling without thermal shock.

In an alternative production method, the heating body, i.e., the cast iron bottom plate 12, is made to size by a traditional method.

Then, in a second step, the bottom plate 12 is inserted in a cold state into a foundry mold.

In a third step, molten stainless steel or molten titanium is added into this mold.

In an alternative embodiment, the plates, top 11 and bottom 12, are held in close contact by bolting, screwing or riveting the bottom plate 12 under the top plate 11. In this case, the density of the bolts, screws or rivets is sufficient to maintain a sufficient pressure between the two plates. Typically, these pressing points are spaced a maximum of ten centimeters from each other.

In another alternative embodiment, the plates, bottom 12 and top 11, are assembled by welding, whether by TIG, spot, continuous roller, etc., method.

ADVANTAGES

To have all the qualities of plancha cooking (homogeneous cooking surface at more than 300° C.), the main problem is that of the increase in temperature and of maintaining this temperature when cold food is placed on the griddle. The device as described above addresses these problems.

It combines, firstly, the resistance and the ease of maintaining stainless steel or titanium and, secondly, the conduction and the thermal inertia of cast iron while avoiding the deformation issues specific to cast iron alone. It does not pose a risk to health.

The invention claimed is:

1. A food cooking device, comprising a thermal inertia griddle comprising a bottom surface thereof and a single heater, in contact with the bottom surface, to heat the griddle by the bottom surface thereof, the griddle consisting of:
   a top stacked plate providing a surface resistance and the top stacked plate defining a cooking surface suitable to receive a food to be cooked;
   a bottom stacked plate providing a thermal inertia and a thermal conduction, the bottom stacked plate defining the bottom surface, the bottom stacked plate comprising a plurality of cast irons arranged side by side to prevent a differential expansion between the top stacked plate and the bottom stacked plate, each of the plurality of cast irons configured as a group of lozenges;
   wherein the top and bottom stacked plates are made of different materials, the top and bottom stacked plates are kept in contact on a part of respective surfaces thereof which are placed opposite one another;

wherein the top stacked plate is made of stainless steel or titanium, and the bottom stacked plate is made of cast iron; and wherein the griddle retains the thermal inertia and the thermal conduction of the cast iron while providing the surface resistance of the stainless steel or titanium to temperature variations.

2. The food cooking device of claim 1, wherein a thickness of the top stacked plate is less than a thickness of the bottom stacked plate.

3. The food cooking device of claim 2, wherein the thickness of the top stacked plate is less than two to ten times less than the thickness of the bottom stacked plate.

4. The food cooking device of claim 1, wherein a thickness of the top stacked plate is from one to five millimeters, and wherein a thickness of the bottom plate is from 0.5 to two centimeters.

5. The food cooking device of claim 1, wherein faces of the lozenges are not parallel to outer edges of the top stacked plate.

6. The food cooking device of claim 1, wherein the top and bottom stacked plates are kept in contact with each other by a hot-bonding, without using external material.

7. The food cooking device of claim 1, wherein faces of each lozenge are not parallel to outer edges of the top stacked plate.

\* \* \* \* \*